(12) United States Patent
Suzuki

(10) Patent No.: US 6,907,406 B2
(45) Date of Patent: Jun. 14, 2005

(54) ON-DEMAND SERVICE EXPANDING SYSTEM AND METHOD FOR PROVIDING SERVICES

(75) Inventor: Motohiro Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 621 days.

(21) Appl. No.: 09/874,016

(22) Filed: Jun. 6, 2001

(65) Prior Publication Data

US 2001/0051929 A1 Dec. 13, 2001

(30) Foreign Application Priority Data

Jun. 9, 2000 (JP) ........................................ 2000-173983

(51) Int. Cl.[7] .............................................. G06F 17/60
(52) U.S. Cl. .............................. 705/52; 705/26; 707/2; 709/201
(58) Field of Search .............................. 705/26–27, 37, 705/44, 52–56, 64; 709/200–202, 206–211; 707/1–6, 9–10, 100–104

(56) References Cited

U.S. PATENT DOCUMENTS

| 5,987,464 A | * | 11/1999 | Schneider ..................... 707/10 |
| 6,049,819 A | * | 4/2000 | Buckle et al. ............... 709/202 |
| 6,141,759 A | * | 10/2000 | Braddy ........................ 713/201 |
| 6,434,546 B1 | * | 8/2002 | Williamowski et al. ........ 707/3 |

FOREIGN PATENT DOCUMENTS

EP 1043671 A2 * 10/2000 ........... G06F/17/60

OTHER PUBLICATIONS

"iSpheres ™ Premieres e–Service Broker ™ at DEMO 2000", PR Newswire, Feb. 7, 2000.*

T. Igakura, et al.; "Management Middleware for Application Front–end on Active Networks", Technical Report of IEICE, SSE99–89, TM99–32, pp. 13–18, Nov. 1999.

* cited by examiner

Primary Examiner—James P. Trammell
Assistant Examiner—Mary Cheung
(74) Attorney, Agent, or Firm—Foley & Lardner LLP

(57) ABSTRACT

A conventional service providing method involves such disadvantages that provision of efficient services cannot be assured in respect of a client, who was connected with a front-end, and that a cost for developing a server is very expensive, besides a cost for administering the service is expensive. In order to eliminate such disadvantages as described above, an on-demand service expanding system provided with at least one service broker, and at least one broker controller, comprises the service broker being provided with a means for selecting a front-end that matches with a demand of service transmitted from a client and a front-end connected with the client to transmit contents of the demand of services with respect to the front-end; and the broker controller being provided with a means for controlling the front-end selected so as to connect the same with the server, and a means for controlling the server and the front-end thus connected as well as the service broker for a period of time during provision of the service.

25 Claims, 10 Drawing Sheets

ON-DEMAND SERVICE EXPANDING SYSTEM AND METHOD FOR PROVIDING SERVICES

FIELD OF THE INVENTION

The present invention relates to a service expanding system having a function for providing services to customers in a communication network composed of communication devices and computers, and particularly to an on-demand service expanding system for distributing widely connection points between a customer and a service with respect to the customer's nearest communication device as occasion demands as well as to a service providing method wherein the on-demand service expanding system is used.

BACKGROUND OF THE INVENTION

An example of a conventional service expanding system is described in a literary document of a lecture on Nov. 15, 1999 "Application Front-end and the Management Middleware Thereof" by Tomohiro Ijikakura, Tohru Egashira, and yoshiaki Kiriha: Study Group for Telecommunication Management (TM) in Academic Conference of Electronics, Information and Communication.

A constitution of the above-described prior art will be described in detail by referring to a diagram.

FIG. 1 is a constitutional block diagram showing a service expanding system FM1, which has been heretofore applied.

The conventional service expanding system FM1 is composed of a look-up functional section 1202, a probe functional section 1203, a front-end control section 1204, a server control section 1205, and a communication base 1206. Furthermore, a client C1, a front-end F1, and a server S1 exist on the service expanding system FM1.

In this case, the client C1 means a program for receiving services that exist on computers, and it is provided by a server because of making a connection with the nearest communication device in a communication network composed of communication devices and computers. For instance, it is a Web browser in WWW (World Wide Web), or a mail reader in electronic mail service. In FIG. 1, although only one client exists, pluralities of clients exist on the service expanding system FM1 in reality.

Moreover, the server S1 corresponds to a program for providing any service that is implemented by an entrepreneur who gains profits from provision of a variety of services such as connection service with the communication network, Web service, and electronic mail, service with respect to customers by utilizing the above-described communication network (hereinafter referred to as simply "entrepreneur"). For example, it is an HTTP server-translating HTTP (hyper-text transfer protocol) in case of the above-mentioned WWW service. While only a single server exists in FIG. 1, a plurality of servers exists actually on the service expanding system FM1.

Besides, the front-end F1 is a light program implemented by an entrepreneur that stands in between the server S1 and the client C1, and which acts for execution of a part of data processing function of the server S1 on a communication device. In FIG. 1, although only a single front-end is in existence, pluralities of front-ends reside on the service expanding system FM1 in reality.

In the following, respective components of the service expanding system FM1 will be described.

The look-up functional section 1202 has a function for looking up a place of a front-end F1 capable of being connected from a name of service needed to use the same by a client C1. More specifically, a plurality of front-ends each providing the same service are grouped, and the optimum front-end (the front-end F1 in FIG. 1) for the client C1 is selected from the plurality of front-ends belonging to these groups in case of searching such front-ends. As manners for selecting the optimum front-end include, for example, one for selecting the nearest front-end from a client, one for selecting a front-end having the lowest load among those belonging to a certain group, one for selecting each of them belonging to a certain group in a sequential order, and the like.

The probe functional section 1203 that resides between the front-end F1 and the client C1 as occasion demands and has a function for acquiring a variety of statistical information produced between the front-end F1 and the client C1. The statistical information includes, for example, an amount of communication transmitted and received between the front-end F1 and the client C1, an amount of resources for communication device that was consumed by the front-end F1 within a certain period of time such as an amount of memory, and the like.

The front-end control section 1204 has a function for effecting communication of the front-end F1 with the server S1 by transmitting mutually each message between the front-end F1 and the server S1 (hereinafter referred to as "fundamental communicating function"), a function for controlling the front-end F1 as to, for example, production, deletion, stop and the like thereof, which is effected by a request for control by the undermentioned server control section 1205 or the front-end F1, and a function for transmitting a change of state such as abnormal termination of, for example, the front-end F1 to the server control section 1205.

The server control section 1205 has a function for administering a program including the front-end F1, the above-mentioned fundamental communicating function, a function for controlling, for example, production, extinguishment and the like of a group obtained by bundling front-ends each providing the same service (hereinafter referred to as "front-end group"), a function for processing statistical information collected by a plurality of the probe functional sections 1203, a function for transmitting a request for controlling a front-end such as production, and deletion of such front-end from the server S1 to the front-end control section 1204, and a function for transmitting a notification for a change of state of a front-end F1 transmitted from the front-end control section 1204.

The communication base 1206 has a function for realizing a communication among the look-up functional section 1202, the probe functional section 1203, the front-end control section 1204, and the server control section 1205 that have been mentioned above, respectively.

Furthermore, each component of the above-mentioned service expanding system FM1 affords functions contained in each of such components with respect to the client C1 as well as the front-end F1, and an interface that is made to be applicable by the server S1 (hereinafter referred to as "middleware functional interface"). This middleware functional interface is a programming interface by which it makes possible to construct an application such as a function in a programming language, for example, a method or the like in Java language, and a CORBA (common object request broker architecture) operation defined by IDL (interface definition language) in CORBA on the service expanding system FM1.

A first problem involved in the above-mentioned prior art resides in that it cannot be assured to provide an efficient service to a client that connected with a front-end. This is because when a front-end with which the client C1 should be connected is selected in the look-up functional section 1202, it is selectable from only existing front-ends as to front end groups, and in other words, the service expanding system FM1 does not have a function for distributing newly front-ends according to need.

A second problem is in an expensive cost for developing server. This is because the prior art adopts such policy that a control function of front-end such as distribution, deletion and the like is to be implemented to the server S1. Thus, the same control function of front-end must be implemented to each server in spite of a fact that control function of front end to be implemented in a server is the same throughout substantially whole service.

A third problem involved in the prior art resides in that an extravagant cost is required for administrating services. This is because the same control method is not necessarily adopted in all the servers according to an intention of a server developer in spite of the fact that control function of front end to be implemented in a server is the same throughout substantially whole service as mentioned above, so that an entrepreneur must master different manners for administration in each service, respectively.

SUMMARY OF THE INVENTION

Accordingly, the present invention has been made to solve the problems involved in the prior art.

An object of the invention is to provide an on-demand service expanding system and a method for providing services by utilizing the on-demand service expanding system by which it can be ensured to provide efficient services with respect to a client that connected with a front-end.

Another object of the invention is to provide an on-demand service expanding system and a method for providing services by utilizing the on-demand service expanding system by which a cost for developing server as well as a cost for administering services can be reduced.

A further object of the invention is to provide an on-demand service expanding system and a method for providing services by utilizing the on-demand service expanding system by which service contents that are forecasted to be used by a client are delivered previously from a server to a front-end to provide a service, whereby a highly responsive service can be provided.

In order to achieve the above described objects, an on-demand service expanding system mounted to a system provided with a server supplying a variety of services including a connection service with a communication network, a number of clients each receiving the variety of services, a number of front-ends each interposed between the clients and the server and executing a part of service providing function involved in the server based on a demand from each of the clients, and service expanding equipment containing internally a communication base according to the present invention, comprises the on-demand service expanding system containing at least one service broker residing on each communication device being a component of the communication network, and at least one broker controller residing on each computer for supplying a variety of services; the service broker being provided with a means for selecting a front-end that matches with a demand of service transmitted from a client and a front-end connected with the client to transmit contents of the demand of service with respect to the front-end; and the broker controller being provided with a means for controlling the front-end selected so as to connect the same with the server, and a means for controlling the server connected by means of the former control means, the front-end, and the service broker from which the contents of the demand of service was transmitted for a period of time during provision of the service.

An on-demand service expanding system according to the present invention, comprises at least one service broker (102 in FIG. 2) residing on each communication device constituting a communication network, and at least one broker controller (103 in FIG. 2) residing on each computer; each service broker involving a means for transmitting a demand for using a service implemented to each front-end that corresponds to the one transmitted from each client and each front-end to a pertinent front-end, a means for transmitting a demand for controlling the front-end to the broker controller, a means for administering information as to a front-end in a communication device on which the service broker oneself resides, and a means for providing an interface by which the respective means are used from the broker controller, the front-ends, and the clients; and the broker controller involving a means for administering a program included on each front-end and the server, a means for controlling each front-end operated on each communication device, a means for controlling the server operated on each computer, a means for controlling the service broker residing on each communication device, a means for administering information required for administering the server and front-ends, and a means for providing an interface by which these means are used from the service brokers, the server, and the entrepreneurs.

Furthermore, the on-demand service expanding system is applied to a service expanding system, which has been utilized heretofore, wherein when a front-end providing a service that is requested from a client to be used by the client does not reside on a communication device in the nearest service broker with which the client has been connected, the service broker transmits a distribution of and a demand for starting up the front-end in question to the broker controller, whereby a connecting point of client with service is distributed in an on-demand manner to the nearest communication device, and as a result, a fresh on-demand service providing system can be realized.

Moreover, when an on-demand service expanding system is applied, the above-described clients, the front-ends, the server, and the above-described on-demand service expanding system, and a conventional service expanding system are constructed wherein in addition to functions that have been retained by a server of the prior art, which provides services to a front-end in accordance with implementation that was performed by an entrepreneur and transmitted from the front-end, the above-described server includes, for example, a function for sorting out e-mails addressed to clients who are identified by each of identifiers, which has been delivered from a broker controller in accordance with a demand for control from the broker controller in case of providing e-mail service to the clients, and a function for extracting service contents, which have been forecasted to be used by a client, e.g., checking of a Web page that is accessed frequently by a client who is identified by an identifier delivered from the broker controller from an access history by means of retaining beforehand and analyzing such access history as a result of tracing the Web page by each client in the case where Web service is provided to clients.

As a result, each of the above-described front-ends has a function for receiving and maintaining service contents that have been extracted by a server and forecasted to be used by a client, and providing the service contents received to the client in addition to a function retained by a front-end of the prior art that is to provide a part of a data processing function of a server upon a client, which has been transmitted from the client, whereby such service providing system of a service-contents preliminary delivery type can be realized.

Besides, in a service providing system of a service-contents preliminary delivery type, the service broker transmits such a demand requesting to transfer service contents that are forecasted to be used by a client in a parallel manner during a period of time wherein the client checks or establishes newly a front-end to be connected with the client at the time when the client connected with the service broker to the front-end in question with respect to the server from which a service to be received by the client is supplied through the broker controller, whereby the service contents that are forecasted to be used by the client have been already present in the front-end in question at the time when the client transmits a demand for use of service to the front-end in question, so that a highly responsive service can be provided.

Furthermore, when the above-mentioned on-demand service expanding system is applied, realized as a fresh service providing method, is a method for providing services composed of a communication network provider, service providers, and customers, comprising the communication network provider constructing and operating a communication network by the use of communication equipment and computers in which the on-demand service expanding system or the service providing system of a service-contents preliminary delivery type has been installed to provide a connecting service with the communication network operated by the communication network provider oneself with respect to the customers, whereby an environment making possible to provide a service to the customers by the use of the on-demand service expanding system residing on the communication network constructed by the communication network provider oneself (hereinafter referred to as "service providing environment") is supplied to a plurality of the service providers, so that use fees for the service providing environment in response to use fees for resources of the communication equipment, e.g., a charge in response to use fees for memory of the communication equipment in addition to communication fees for the communication network operated by the communication network provider oneself are collected from the plurality of service providers; and the service providers constructing servers and front-ends in which services to be provided to customers have been installed in the service providing environment supplied from said communication network provider to distribute clients to the customers thereby to provide services with respect to the customers, and determining use fees of a service to be supplied to the customers from the service providers themselves with taking fees to be paid to the communication network provider into consideration, and collecting the fees determined from each customer who makes an agreement with the service providers in use of services.

Moreover, the communication equipment developer plays a role to manufacture communication devices and computers to which the on-demand service expanding equipment has been implemented (hereinafter referred to as "communication network equipment"), and a role to supply the communication network equipment thus manufactured to the communication network provider. Further, the communication equipment developer plays a role to provide a manner for implementing a server, a front-end, and a client with respect to the service provider in response to the communication network equipment which has been supplied to each communication network provider by the use of the on-demand service expanding equipment for the sake of supplying a service to the customer (hereinafter referred to as "service implementing atmosphere"). In addition, the customer plays a role to receive a variety of services such as a connecting service with a communication network operated by a communication network provider that is derived from an agreement with the communication network provider as well as a Web service, an e-mail service, and the like service operated by a service provider that is derived from an agreement with the service provider as a result of paying use fees that are derived from the agreement with either of the communication network provider or the service provider.

The above-mentioned on-demand service expanding system or a service providing system of a service-contents preliminary delivery type is realized by installing a program being software stored in a storage medium into computers or communication devices.

BRIEF DESCRIPTION OF THE DRAWINGS

The present invention will be explained in more detail in conjunction with appended drawings, wherein.

DESCRIPTION OF THE PREFERRED EMBODIMENTS

Preferred embodiments of the invention will be described in detail hereinafter by referring to the accompanying drawings.

Figure 1:
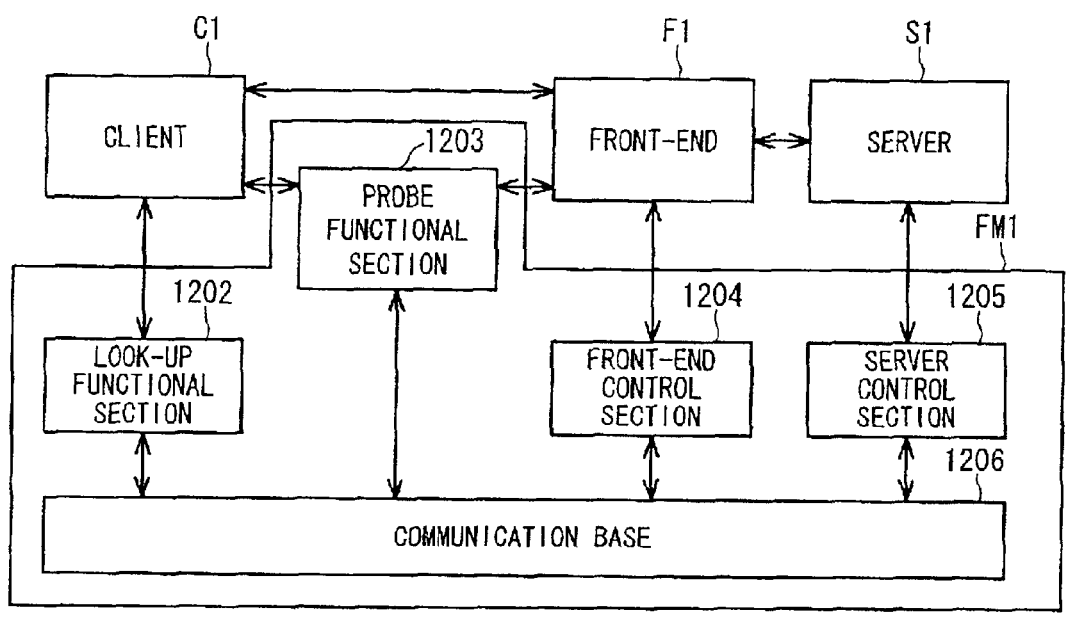
FIG. 1 is a block diagram showing a constitution of a conventional service expanding system.
Figure 2:
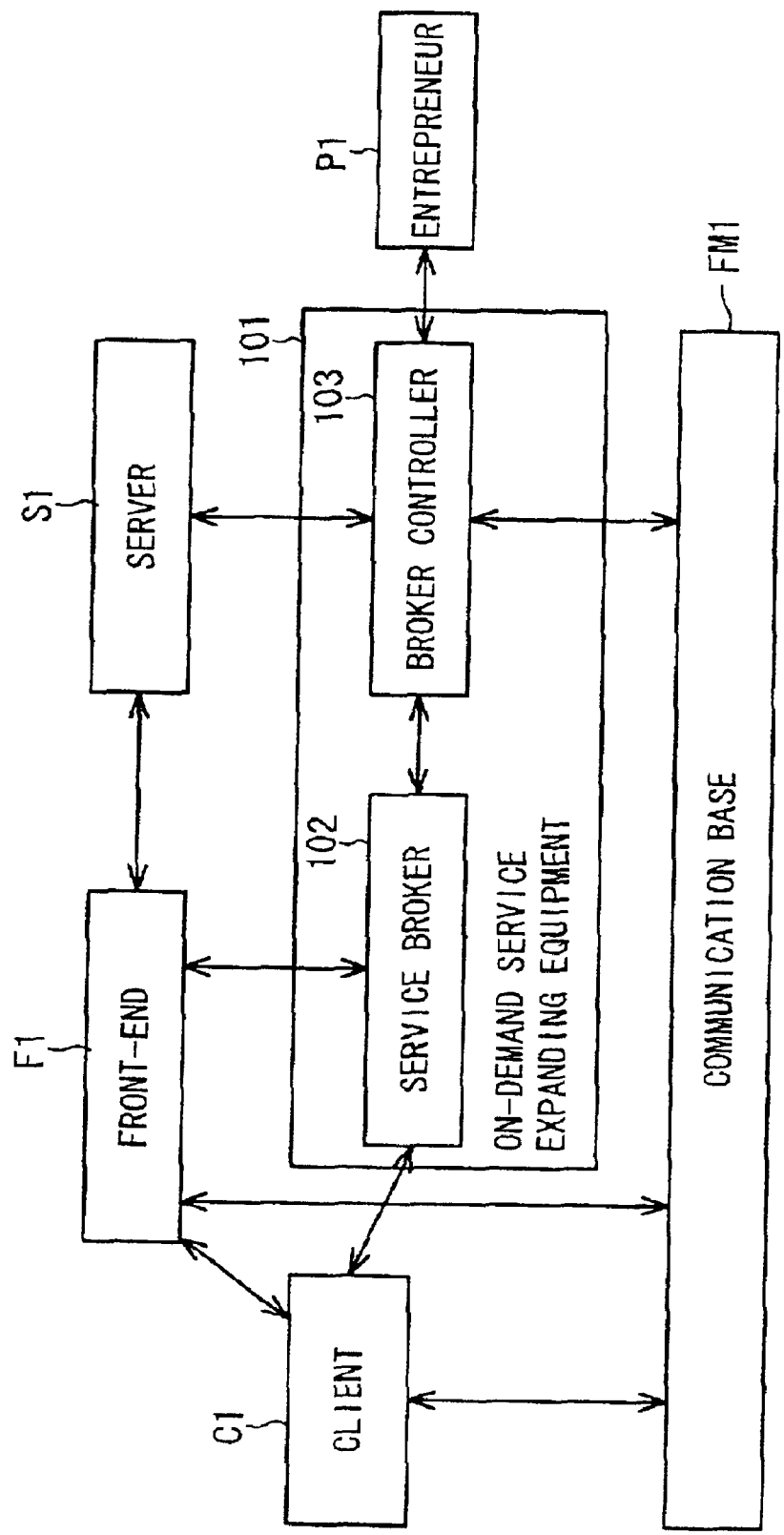
FIG. 2 is a block diagram showing a constitution of an on-demand service distributing system according to a first embodiment of the present invention.

FIG. 2 is a block diagram showing a constitution of on-demand service expanding equipment in a service providing system wherein the client, the server, the front-end, and the service expanding equipment on a communication network shown in FIG. 1 have been applied.

Referring to FIG. 2, the on-demand service expanding equipment 101 being an embodiment of the present invention is located between a service expanding system FM1 and a group of a client C1, a front-end F1, and a server S1; and the on-demand service expanding equipment 101 is composed of a service broker 102 and a broker controller 103.

One or more of service brokers 102 reside in each communication device constituting a communication network. It is to be noted that only one service broker has been shown in FIG. 2, but a plurality of service brokers exist on a communication network in reality.

Furthermore, the service broker 102 contains a means for transmitting a demand for use of services (hereinafter referred to as "demand for use of services") mounted to a front-end to a pertinent front-end from the client C1 and the front-end F1, a means for transmitting a control demand such as production, deletion and the like for a front-end to the broker controller 103, a means for administering information concerning a front-end on a communication device on which the front-end oneself resides (hereinafter referred to as "front-end information"), and a means for providing an interface for using these means from the broker controller 103, the front-end F1, and the client C1, respectively (hereinafter referred to as "service broker functional interface"). The service broker functional interface is, for example, API being a function in a programming language, OR (object reference) used in CORBA, a port used in socket communication, or the like.

Moreover, the front-end information has been implemented on a front-end, and which contains an interface for connecting the client C1, the server S1, and the service broker 102 with the front-end F1 (hereinafter referred to as "front-end reference interface"), a name of service, which has been implemented on the front-end, and information of a communication device on which the front-end resides. In addition, the front-end information retained in the service broker 102 corresponds to a duplication of front-end information retained in the broker controller 103. Further, a front-end reference interface contained in the front-end information is, for example, OR used in CORBA or the like. Besides, information of a communication device is, for example, an IP address being a communication address of the communication device or the like.

Figure 3:
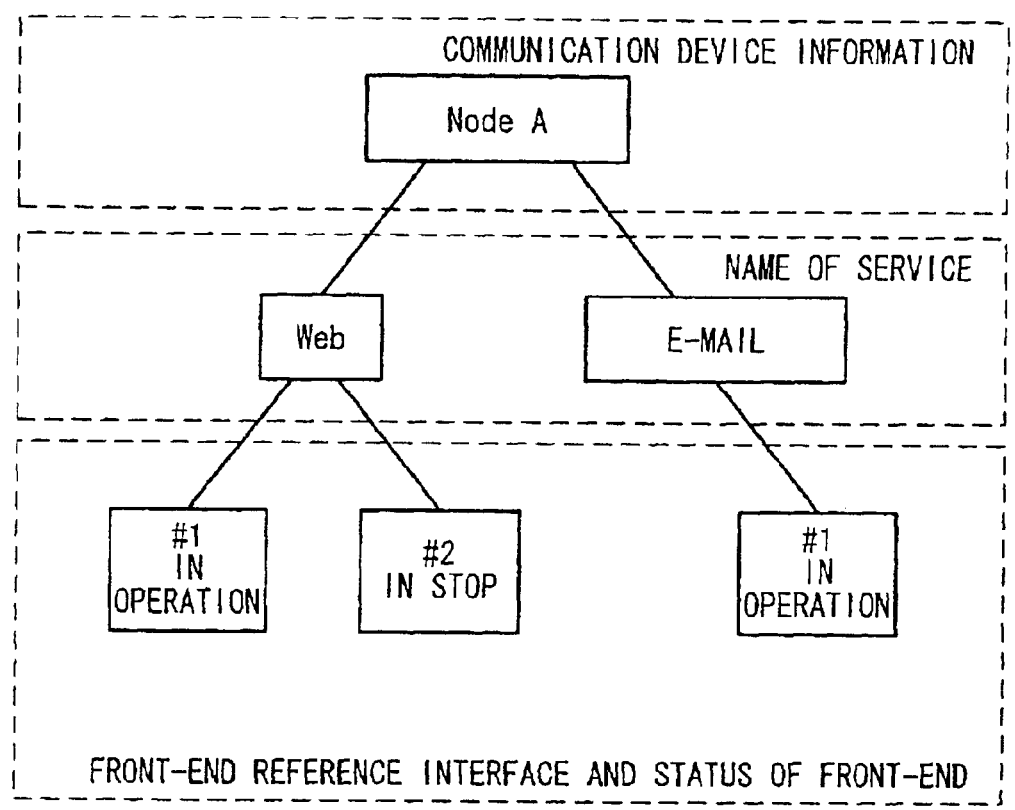
FIG. 3 is block diagram showing an example of a manner for storing front-end information retained in a service broker.

Furthermore, such front-end information as mentioned above is stored in the form of wood, for example, as shown in FIG. 3 wherein a root is a structure storing information of a communication device, a node is a structure storing each name of service, and a leaf is a structure storing a state of a front-end, respectively.

One or more of the broker controllers 103 exist on a computer for providing services. While only one broker controller has been shown in FIG. 2, a plurality of broker controllers exist actually on a communication network.

Figure 4:
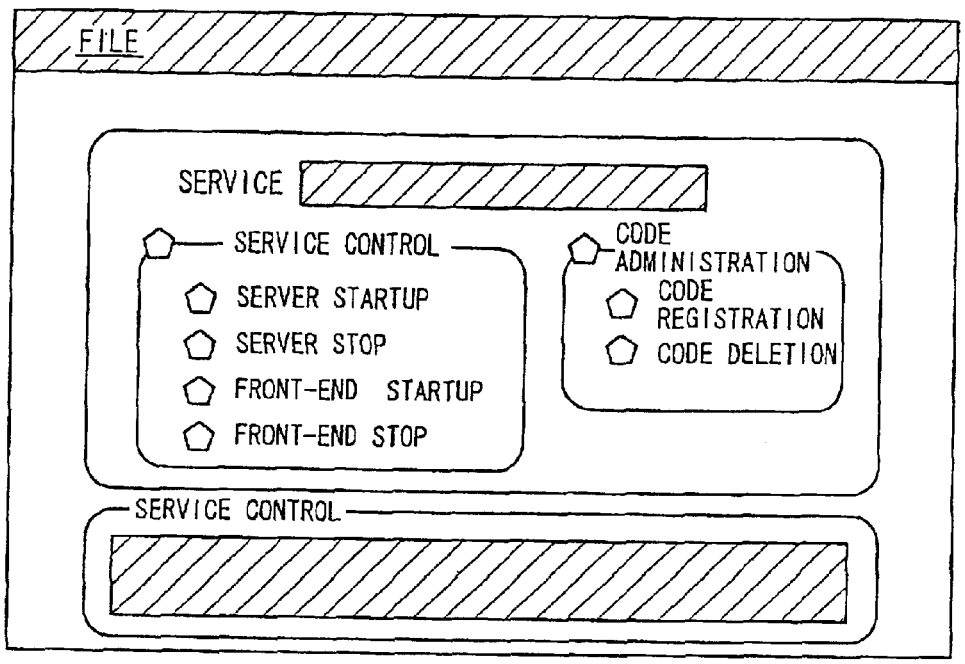
FIG. 4 is a diagram showing an example of a broker controller functional interface that is supplied to an entrepreneur by a broker controller.

Moreover, the broker controller 103 has a means for administering a program developed by an entrepreneur P1 who provides services to a customer by the use of the on-demand service expanding equipment 101, a means for controlling the front-end F1 operating on a communication device, a means for controlling a service broker 102 resides on each communication device, a means for administering information required for administering the server 1 and the front-end F1 (hereinafter referred to as "service administering information"), and a means for providing an interface for employing these means from the service broker 102, the server S1, and the entrepreneur P1 (hereinafter referred to as "broker controller functional interface"). The broker controller functional interface corresponds to, for example, API being a function in a programming language, OR used in CORBA, a port used in a socket communication and the like. Further, concerning the broker controller functional interface with respect to the entrepreneur P1, there is a case where it becomes a man-machine interface as shown in FIG. 4 in addition to the above-described example.

The service administering information contains program information, server information, and system information in addition to the original information of front-end information administered by the above-mentioned service broker 102.

The program information corresponds to information as to a program implementing the server S1 and the front-end F1, and that contains an identifier assigned by the broker controller 103 so as to be alone therein for identifying the program by means of the broker controller 103 (hereinafter referred to as "program identifier") and a name of service, which can be realized by employing the programs of the server S1 and the front-end F1.

The server information contains an interface for connecting the front-end F1 as well as the broker controller 103 with the server S1 (hereinafter referred to as "server reference interface") and a name of service implemented to the server S1. This server reference interface is, for example, OR used in CORBA and the like.

The system information contains a service broker functional interface wherein the broker controller 103 performs a connection with the service broker 102 resides on each communication device, information of a communication device on which the service broker 102 resides, and a middleware functional interface for using a control function and the like of a front-end provided by the service expanding system FM1.

Figure 5:
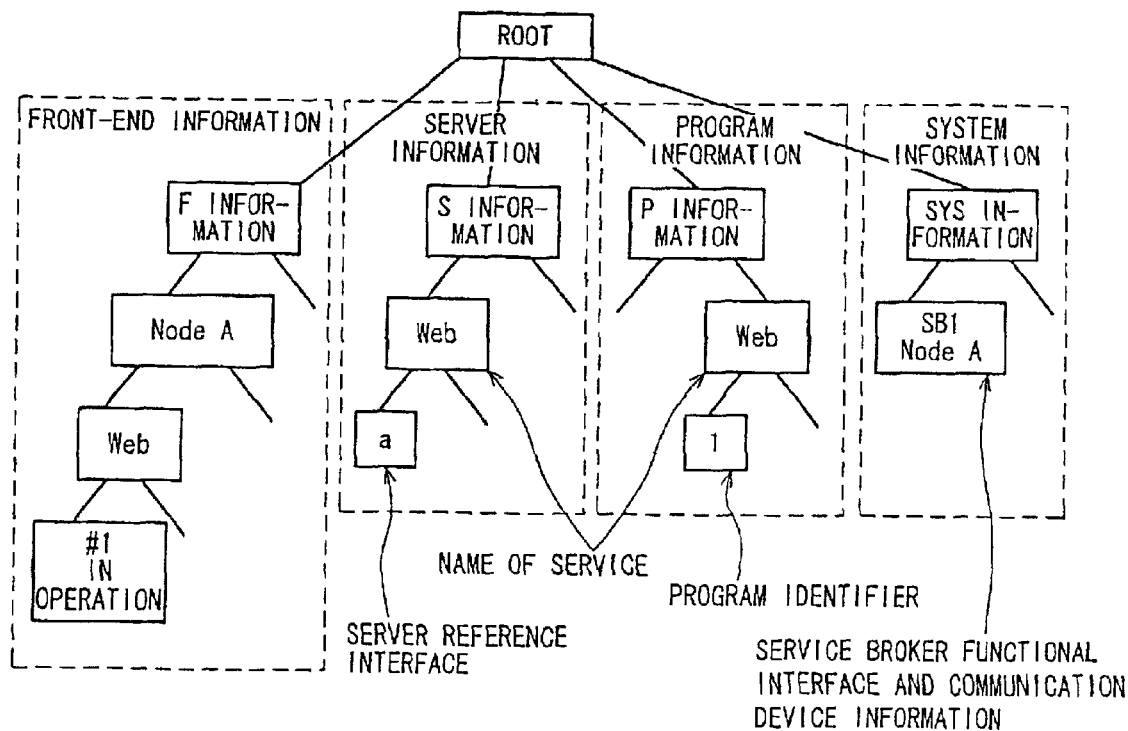
FIG. 5 is a block diagram showing an example of a manner for storing service information retained in a broker controller.

Furthermore, such service administering information is stored in the form of a wood structure, for example, as shown in FIG. 5, wherein a structure for exercising general control of all the information is a root, and respective parts of the wood, i.e., front-end information is a part of the wood (that corresponds to a wood part on and after F-information node shown in FIG. 5), server information is a part of the wood (that corresponds to a wood part on and after S-information node of FIG. 5), program information is a part of the wood (that corresponds to a wood part on and after P-information node of FIG. 5), and system information is a part of the wood (that corresponds to a wood part on and after Sys-information node shown in FIG. 5), respectively.

In the following, operations of the on-demand service expanding equipment 101 will be described in detail by referring to FIGS. 6 and 7.

Figure 6:
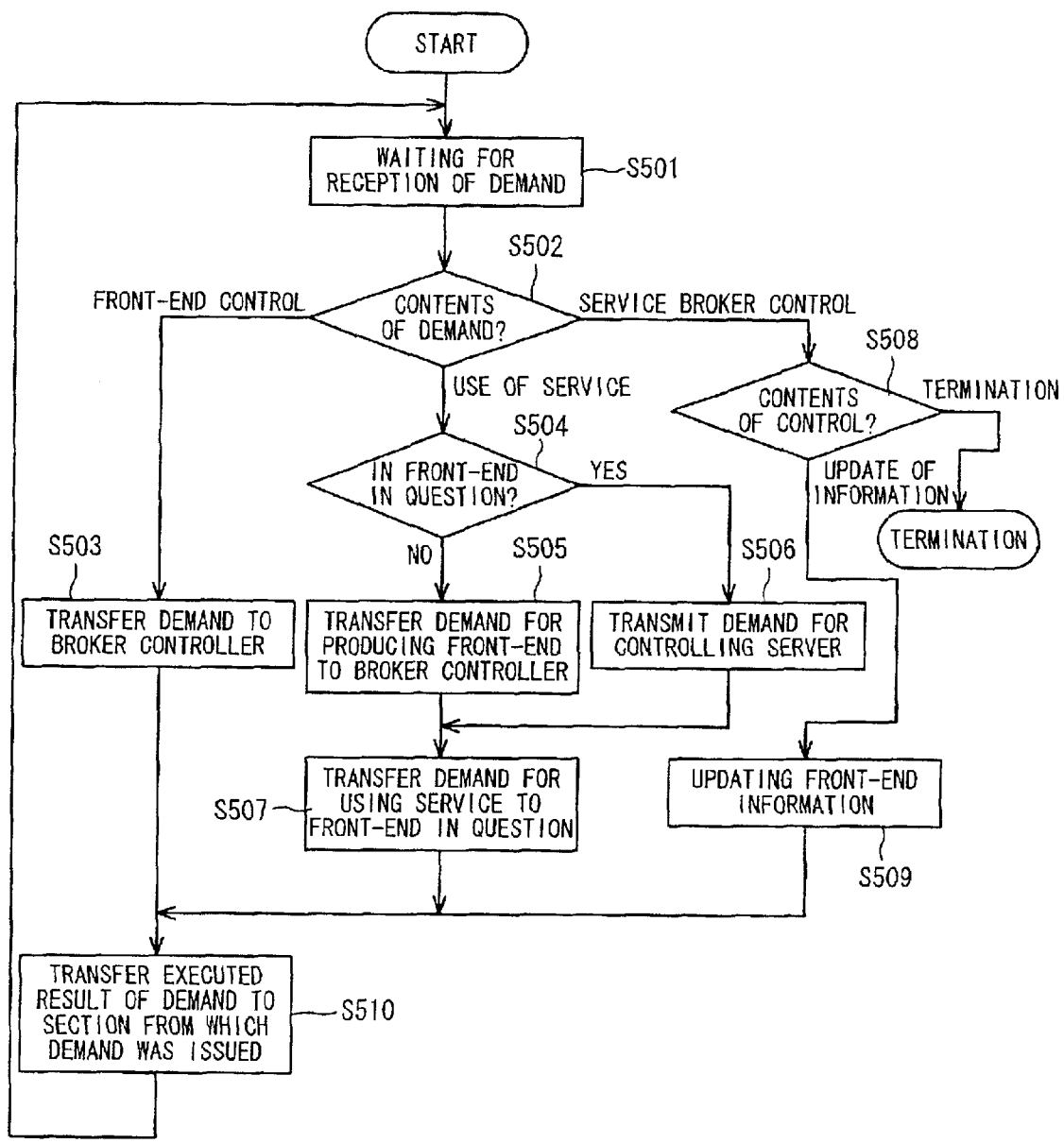
FIG. 6 is a flowchart illustrating operations of a service broker.

FIG. 6 is a flowchart illustrating operations of the service broker 102 wherein first, the service broker 102 is in a waiting state of demand for operation that is transmitted from the front-end F1, the client C1, or the broker controller 103 (step S501). When the demand for operation was received under this condition through a service broker functional interface supplied from the service broker 102 (step S502), the service broker 102 takes operations described hereunder in response to contents of a demand. It is to be noted that the following operations are implemented in a parallel manner by the use of, for example, threads and the like in the service broker 102.

In the case when the demand for operation received in the step S502 is the one directing to another front-end that was transmitted from the front-end F1, the demand for operation received in the step S502 is transmitted to the broker controller 103 (step S503). This treatment is executed by the use of a broker controller functional interface that is provided from the broker controller 103. For instance, in the case where the broker controller functional interface is defined by CORBA IDL, this arrangement results in start-up of CORBA operation realizing front-end control.

In the case where the demand for operation received in the step S502 is the one for a service from the client C1, which is provided by the front-end F1, it is checked whether a front-end F1 providing the service in question resides or not on a communication device on which the former front-end F1 exists (step S504). This conduct is performed by searching whether front-end information including a name of the service in question resides or not in the front-end information retained in the service broker 102.

As a result of the step S504, when the front-end in question does not reside, a demand for producing the front-end in question is retransmitted to the broker controller 103 (step S505). This treatment is executed by the use of a broker controller functional interface supplied by the broker controller 103.

As a result of the step S504, when there is the front-end in question, a demand for control of server is transmitted to the broker controller 103 as occasion arises (step S506). For instance, in the case where there has already been the front-end in question on a communication device on which the service broker 102 resides, which has been connected with the client C1 in a service expanding system of a service-contents preliminary delivery type, which will be described later, a control command of the server S1 is transmitted to the broker controller 103 for the sake of commencing transfer of service contents that are forecasted to be used by the client C1 from which use of a service was demanded. This transmission is performed by the use of a broker controller functional interface provided from the broker controller 103.

As a result of the step S505, either when the front-end in question was produced by the broker controller 103, or when a control demand of the server S1 is transmitted according to need as a result of the step S506, a demand for use of service from the client C1, which was received in the step S502 is transmitted to the front-end in question. This treatment is performed with the use of a front-end reference interface contained in the information concerning the front-end in question in the front-end information administered by the service broker 102. For instance, when the front-end reference interface has been defined by CORBA IDL, CORBA operation having an executive function that has been implemented to the front-end in question is activated by using the demand for use received in the step S502 as an argument. As a result of the step S505, information of the front-end in question produced by the broker controller 103 is contained in an information updating demand transmitted from the broker controller 103 during execution of the step S505. Operations in case of receiving the information updating demand will be mentioned hereinafter.

When a demand for operation received in the step S502 is a demand for control of the service broker 102, control contents received are checked (step S508).

As a result of the step S508, the control contents are the ones for updating front-end information that is administered by the service broker 102, the front-end information is updated in accordance with the control contents such as addition, and deletion (step S509).

As a result of the step S508, the control contents are the ones for terminating operations of the service broker 102, the service broker oneself terminates the operations thereof.

Results of treatments that have been executed heretofore are returned to an initial section from which a demand for operation was transmitted and that was received in the step S502 (step S510). Thereafter, a procedure is repeated from the step S501.

Figure 7:
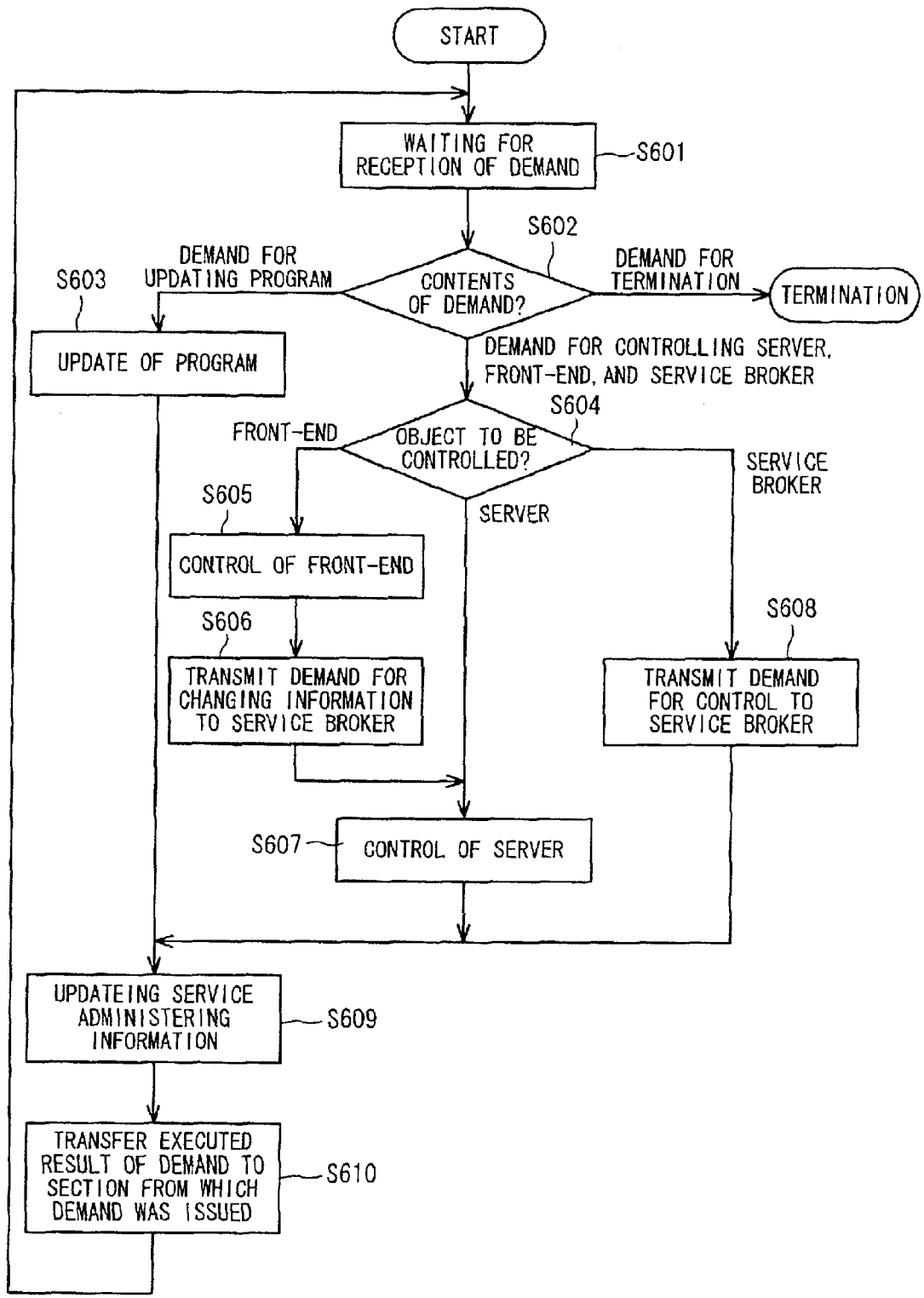
FIG. 7 is a flowchart illustrating operations of a broker controller.

FIG. 7 is a flowchart illustrating operations of the broker controller 103.

First, the broker controller 103 is in a waiting state of a demand for operation transmitted from the service broker 102, the server S1, or the entrepreneur P1 (step S601). In this state, when a demand for operation was received through a broker controller functional interface provided by the broker controller 103 (step S602), the broker controller takes the following operations in response to contents of a demand. It is to be noted that the following operations are executed in a parallel manner by the use of, for example, threads and the like in the broker controller 103.

When contents of a demand received in the step S602 are in a demand for updating a program implemented to the server S1 and the front-end F1, the broker controller 103 updates the program stored in a disk in response to contents of update such as addition, and deletion (step S603). For instance, in the case where the contents direct to add newly a program, a file storing the program is produced newly in the disk, while a file storing a program is deleted from the disk in the case where the contents instruct to delete the program.

When contents of a demand received in the step S602 are the ones for controlling the server S1, the front-end F1, or the service broker 102, an object to be controlled is checked (step S604).

As a result of the step S604, when an object to be controlled is the front-end F1, the front-end F1 is controlled by the use of a front-end controlling function, which is provided by the service expanding system FM1 (step S605). This function actuates through a middleware functional interface that is provided by the service expanding system FM1. For instance, in case of producing newly a front-end F1, a program for front-end in question, which is retained in the broker controller 103 and an initial value required in case of operating the front-end are delivered to the service expanding system FM1 in accordance with a manner for producing front-end, which is provided by a middleware functional interface, or the like procedure is taken.

Thereafter, a demand for updating front-end information of the front-end F1 in question is transmitted to the service broker 102 on a communication device on which the front-end F1 that is an object to be controlled resides (step S606). This treatment is performed by checking system information retained in the broker controller 103, and using a service broker functional interface provided by the service broker 102 in question.

Then, a server is controlled as occasion demands (step S607). As described in paragraphs for explaining operations of respective components in a service expanding system of a service-contents preliminary delivery type, which will be mentioned later, such server control is executed in case of, for example, notifying of completion of production of a new front-end to the server S1. In this case, a manner for controlling the server S1 can be realized by starting up a CORBA operation to which a function for receiving a notice in the server S1 has been implemented with a use of a notice indicating completion of production of a new front-end as an argument in the case where, for example, a function implemented to the server S1 is defined by CORBA IDL.

As a result of the step S604, when an object to be controlled is a server S1, control is made upon the server S1 in question (step S607). This treatment is executed by the use of a server reference interface stored in server information that is retained in the broker controller 103. For instance, when a new server is produced in case of a manner wherein a server housing a server reference interface defined by CORBA IDL operates on a thread produced by the broker controller 103, the broker controller 103 produces the new thread, then, executes a program including the server by means of the thread, and starts up a CORBA operation for initializing the server, which has been implemented in the server.

As a result of the step S604, when an object to be controlled is the service broker 102, a demand for control of the service broker 102 in question is transmitted (step S608). This treatment is performed by the use of a service broker functional interface stored in system information retained in the broker controller 103. For instance, when the service broker functional interface has been defined by CORBA IDL, the broker controller 103 starts up a CORBA operation that is provided by the service broker 102, and which executes contents of control requested.

Any of a case where updating of a program being an object to be updated was completed as a result of the step S603, a case where a change of front-end information due to transmission of a demand for changing the front-end information to the service broker 102 was completed as a result of the step S606, or a case where control of the service broker 102 due to transmission of a demand for control from the service broker 102 being an object to be controlled was completed as a result of the step S608, a necessary place of information for service administration that is administered by the broker controller 103 is changed (step S609). A place of the information for service administration to be changed in each of the above-described cases is as follows.

In case of completion of the step S603, program information is changed. For example, it is an addition of items as to a program that has been newly added (a name of service, and a program identifier) to the program information, a deletion of items as to a program that has been deleted from the program information, a change of an identifier as to a program that has been replaced or the like matter.

In case of completion of the step S606, front-end information is changed. More specifically, in order to match front-end information retained in the service broker 102 from which a demand for updating was transmitted in the step S606, the contents updated that were transmitted to the service broker 102 in the step S606 are applied to the front-end information retained in the broker controller 103 without any modification.

In case of completion of the step S607, server information is updated. More specifically, information concerning the server S1 that was an object to be controlled is added newly or deleted in response to contents of control.

In case of completion of the step S608, service broker information is updated. For instance, when the service broker 102 was deleted in the step S607, information of the service broker 102 is deleted from the service broker information.

Thereafter, results of the treatments that have been executed heretofore are returned to sections from which demands had been transmitted (step S610). Then, procedures are repeated from the step S601.

Furthermore, when a demand for operation that was received in the step S602 is a demand for terminating operation of the broker controller 103, operation of the broker controller 103 oneself is terminated.

In the following, a service providing system of a service-contents preliminary delivery type to which an on-demand service expanding system according to an embodiment of the present invention has been applied will be described in detail by referring to the accompanying drawings wherein a constitution of the service providing system of a service-contents preliminary delivery type is the same as that shown in FIG. 2.

In addition to functions that have been retained by a server of the prior art, which provides services to a front-end in accordance with implementation that was performed by an entrepreneur and transmitted from the front-end, a server in the service providing system of a service-contents preliminary delivery type includes, for example, a function for sorting out e-mails addressed to clients who are identified by each of identifiers, which has been delivered from a broker controller in accordance with a demand for control from the broker controller in case of providing e-mail service to the clients, and a function for extracting service contents the use of which by a client have been forecasted, e.g., checking of a Web page that is accessed frequently by a client who is identified by an identifier delivered from the broker controller from an access history by means of retaining beforehand and analyzing such access history as a result of tracing the Web page by each client in the case where Web service is provided to clients.

Moreover, a front-end in the service providing system of a service-contents preliminary delivery type has a function for receiving and maintaining service contents that have been extracted by a server and forecasted to be used by a client, thereby providing the service contents received to the client in addition to a function retained by a front-end of the prior art that is to provide a part of a data processing function of a server, which has been transmitted from a client, upon the client.

Concerning the other components, they have the same functions as those mentioned above.

In the following operations of the service providing system of a service-contents preliminary delivery type will be described in detail by referring to FIGS. 8 through 10.

Figure 8:
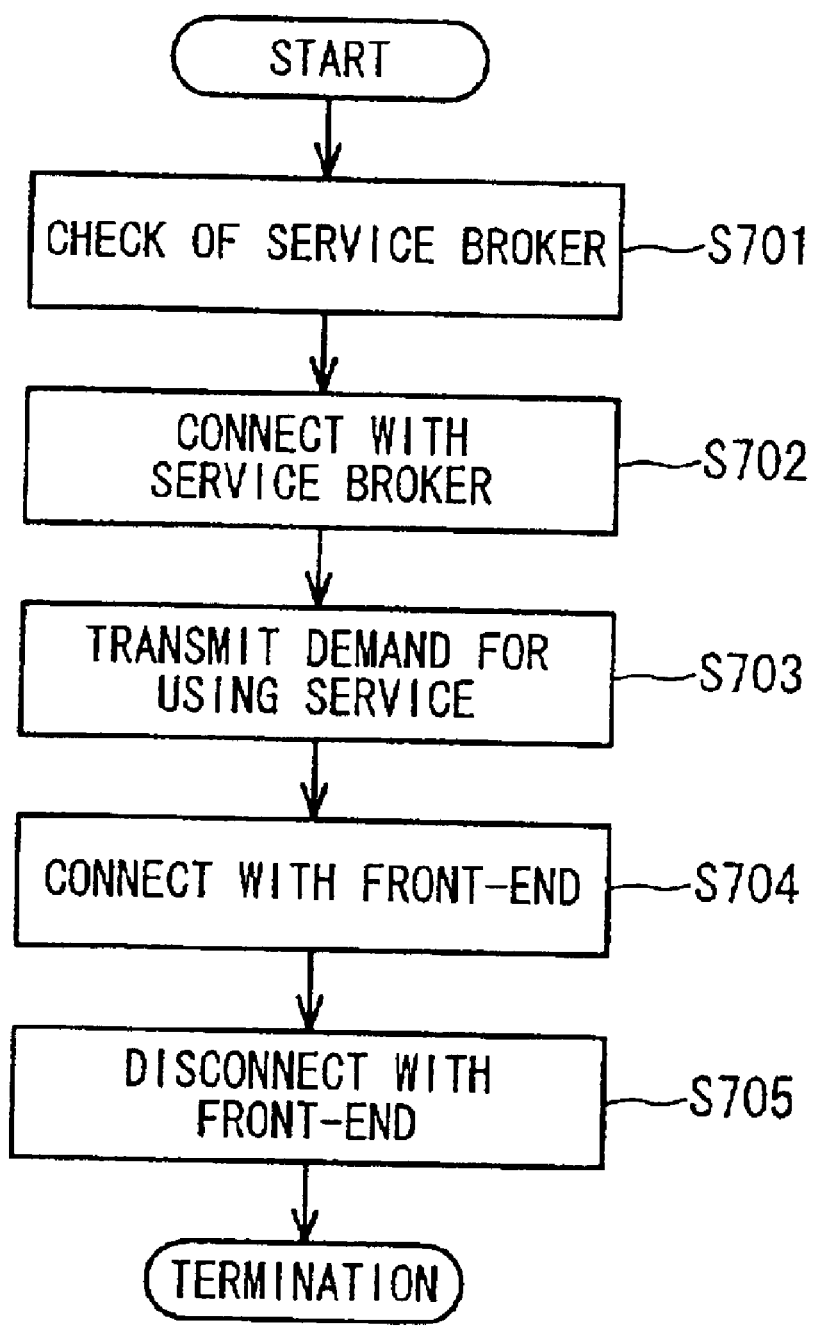
FIG. 8 is a flowchart illustrating operations of a client in a service providing system of a service-contents preliminary delivery type that is an example to which has been applied an on-demand service expanding system according to an embodiment of the present invention.

FIG. 8 is a flowchart illustrating operations of a client C1. It is to be noted that although no prescription has been defined as to operations of a client in the on-demand service expanding equipment 101 according to an embodiment of the present invention, the following operations must be made by a client in a service expanding system of a service-contents preliminary delivery type to which the on-demand service expanding equipment 101 has been applied.

First, the client C1 checks a connectable service broker 102 by the client oneself with the use of a function provided from a service expanding system FM1 (step S701). This check starts up a look-up function provided by the service expanding system F1 through a middleware functional interface.

Information of the connectable service broker 102 with the client C1 acquired as a result of the step S701 is used, whereby the client connects with the service broker 102 in question (step S702). For instance, when a communication device on which the service broker 102 in question resides is equipped with a TCP/IP protocol stack, the client C1 starts up a connect ( ) system call in UNIX OS (operating system) by the use of an IP address of a communication device wherein the service broker 102 in question actuates as a result of the step S701 and a port number that is administered by the service-broker 102 for the sake of acquiring a combination thereof, whereby the client C1 can connect with the service broker in question 102.

Then, a demand for using service that is desired by the client C1 is transmitted to the service broker 102 connected in the step S702 (step S703). For instance, when the client C1 was implemented as a Web browser in WWW (world wide web), the service broker 102 transmits a Web page indicating a view of service provided by an entrepreneur P1 at present (hereinafter referred to as "SHP: service home page") at the time when the client C1 connects with the service broker 102 (at the time when the step S702 completes), so that the clients C1 selects a service that is desired to use by the client oneself from the SHP. In this manner, a demand for using services corresponds to a URL (universal resource locator) of a selectable link, which has been described in the SHP.

As a result of the step S703, the client C1 is connected to a front-end F1 wherein service can be received by means of a function for allocating a demand for using service to a pertinent front-end, which is retained by the service broker 102 (step S704).

Then, the client C1 employs a service provided by a front-end F1, which has been connected, and the connection of the front-end F1 is terminated at the time of terminating employment of the service (step S705).

Since operations of a service broker 102 and operations of a broker controller 103 are the same those shown in FIG. 6 and those shown in FIG. 7, respectively, the explanations thereof are omitted herein.

In a service providing system of a service-contents preliminary delivery type, to notify of a timing for transferring service contents that are forecasted to be used by a client C1 from a server S1 to a front-end F1 to the server S1 on the basis of the operations of FIGS. 6 and 7, a demand for producing a front-end and a demand for controlling a server were transmitted, respectively, in either the case where no front-end F1 to be connected with the client C1 exists in the step S505, or the case where a front-end to be connected with the client C1 exists in the step S506, and then the service broker 102 executes a connecting treatment of the client C1 with the front-end F1, whereby a preliminary delivery of service contents to the front-end F1 is realized. Thus, service contents that are forecasted to be used by the client C1 existed already in the front-end F1 to be connected at the time when a service is received by the client C1 from the front-end F1 (step S704).

Figure 9:
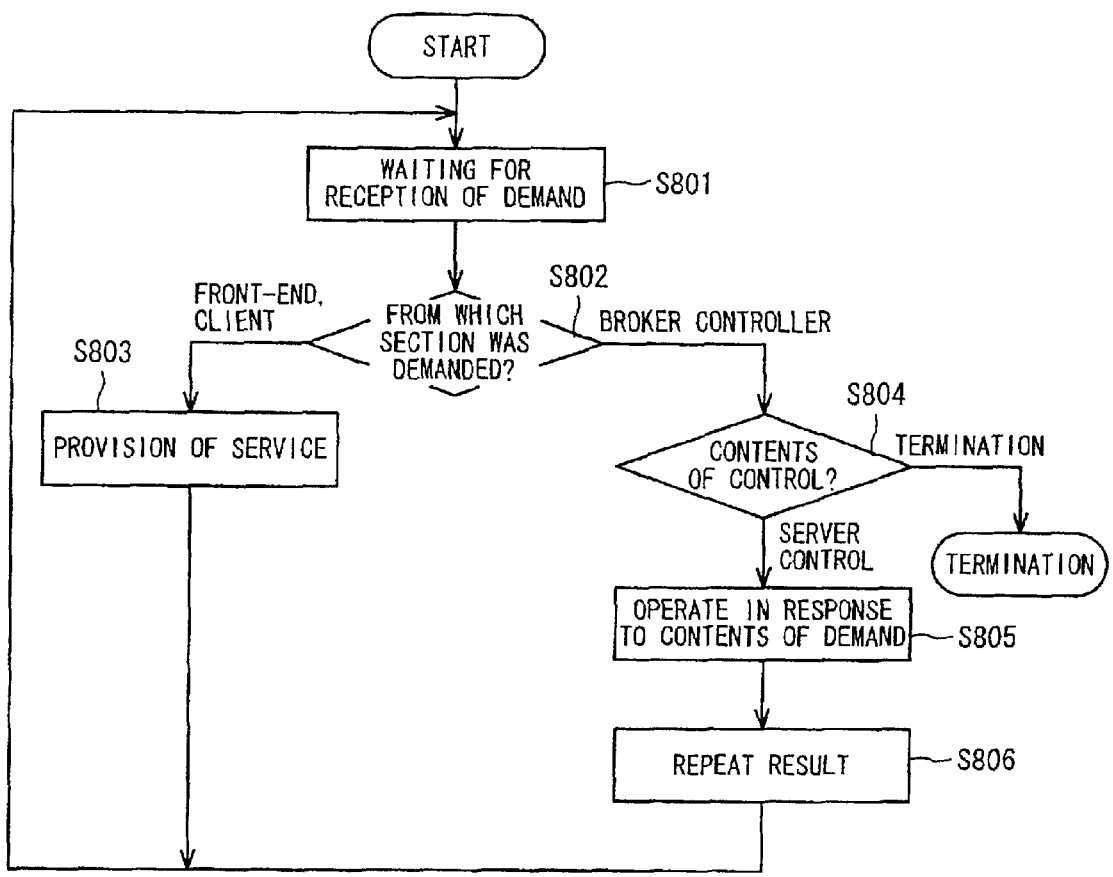
FIG. 9 is a flowchart illustrating operations of a server in a service providing system of a service-contents preliminary delivery type that is an example to which has been applied an on-demand service expanding system according to an embodiment of the present invention.

In the following, operations of a server S1 will be described in detail by referring to the accompanying drawings wherein FIG. 9 is a flowchart illustrating operations of the server S1.

First, the server S1 is in a waiting state of a demand for operation transmitted from a front-end F1, a client C1, or a broker controller 103 (step S801). In this state, when a demand for operation was received through a server reference interface (step S802), the following steps are taken dependent upon a section from which a demand for operation was transmitted. In this case, the following operations are executed in the server S1 in a parallel manner by the use of, for example, threads and the like.

When a section from which a demand for operation that was received in the step S802 was transmitted is a front-end F1 or a client C1, services implemented to a server S1 by an entrepreneur P1 are supplied to a section from which a demand for operation that was received in the step S802 was transmitted (step S803).

When a section from which a demand for operation that was received in the step S802 was transmitted is a broker controller 103, contents of a demand are further checked (step S804).

As a result of the step S804, when the contents of a demand are server control, it operates in accordance with the contents of a demand (step S805). Operations performed by the server S1 include the one for extracting service contents that are forecasted to be used by a client C1 in response to information of a client identifier of the client C1 by whom a use of service is demanded, which has been delivered from the broker controller 103, or information of a communication device being a place where a service is supplied to the client C1, and the service contents thus extracted are delivered to a front-end F1 in question. In this case, a manner for extracting service contents which are forecasted to be used by the client C1 that are to be delivered to the front-end F1 includes, for example, the one for sorting out e-mails addressed to clients who are identified by each of client identifiers, which has been delivered from a broker controller 103 in accordance with a demand for control from the broker controller 103 in the case where the server S1 provides e-mail service to the clients, and a manner for checking a Web page that is accessed frequently by a client C1 who is identified by a client identifier delivered from the broker controller 103 from an access history by means of retaining beforehand and analyzing such access history as a result of tracing the Web page by each client, and transferring contents of the Web page to the front-end F1 in the case where the server S1 provides Web service to clients.

Then, results of execution in the step S805 returns to the broker controller 103 being a section from which a demand was issued (step S806).

In either of a case where control results of the broker oneself were transmitted to a section from which a demand was issued in the step S806, or a case where a service included in the server S1 was provided to the client C1 or the front-end F1 in the step S803, a procedure is repeated from the step S801.

Furthermore, when contents of a demand from the broker controller 103 are that of termination of the server S1 as a result of step S804, the broker controller 103 terminates its own operation.

Figure 10:
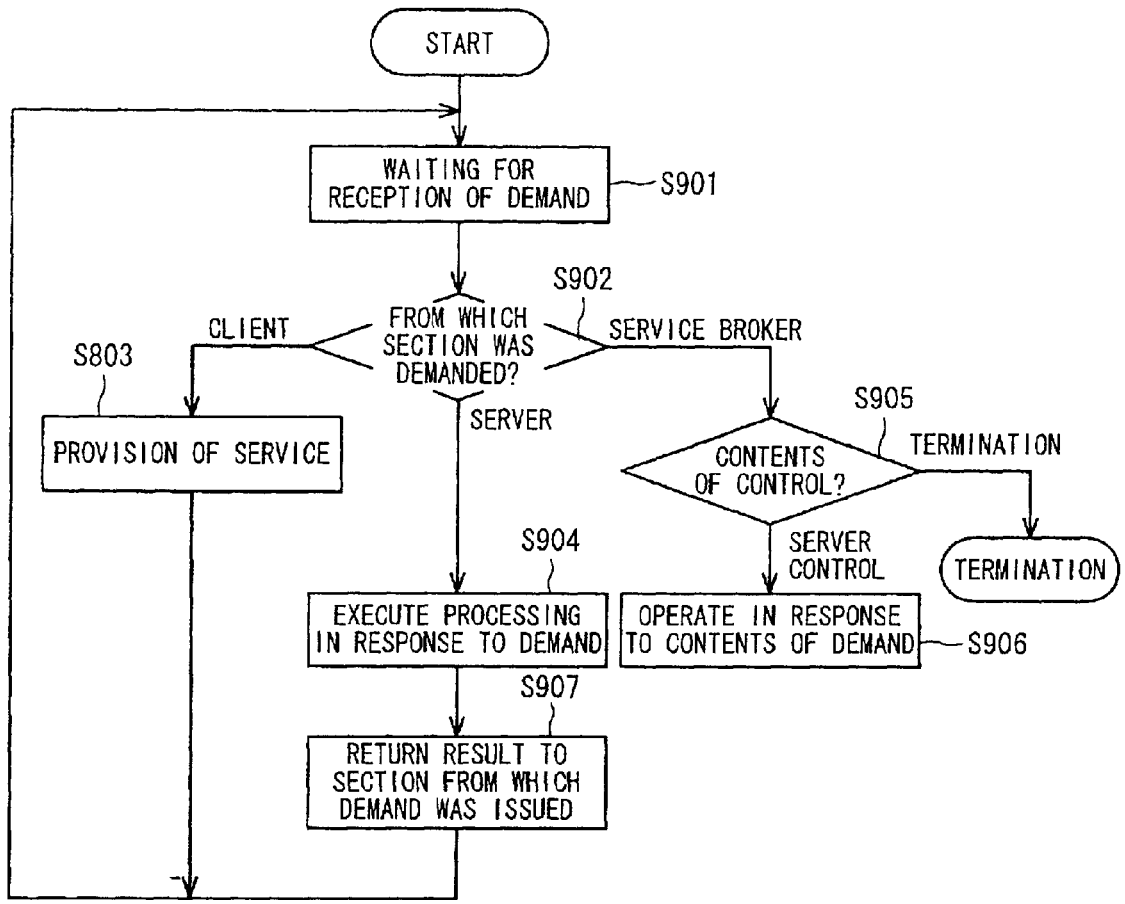
FIG. 10 is a flowchart illustrating operations of a front-end in a service providing system of a service-contents preliminary delivery type that is an example to which an on-demand service expanding system according to an embodiment of the present invention has been applied.

In the following, operations of a front-end F1 will be described in detail by referring to accompanying drawings wherein FIG. 10 is a flowchart illustrating operations of the front-end F1.

First, the front-end F1 is in a waiting state of a demand for operation transmitted from a client C1, a server S1, or a service broker 102 (step S901). In this state, when a demand for operation was received through a server reference interface (step S902), the following steps are taken dependent upon a section from which a demand for operation was transmitted. In this case, the following operations are executed in the front-end F1 in a parallel manner by the use of, for example, threads and the like.

When a section from which a demand for operation that was received in the step S902 was transmitted is a client C1, the front-end F1 provides a service to the client C1 in accordance with operations included in the front-end F1 oneself (step S903).

When a section from which a demand for operation that was received in the step S902 is the server S1, the front-end F1 executes a treatment in response to a request from the server S1 in accordance with operations included in the front-end F1 oneself (step S904). An operation executed by the front-end F1 includes, for example, the one for storing service contents that are forecasted to be used by the client C1, which has been connected with the front-end F1, and that were transmitted from the server S1 in a disk that is administered by the front-end F1 oneself.

When a section from which a demand for operation that was received in the step S902 is the service broker 102, contents of the demand are further checked (step S905).

As a result of the step S905, when the contents of demand are the one for terminating the front-end F1, the front-end F1 oneself terminates operations thereof.

As a result of the step S905, when contents of a demand are the one other than that for terminating the front-end F1, a procedure executes control in response to the demand (step S906). An example of such demands includes the one for setting up a valuable required for initiating provision of a service to the client C1 at the time when the front-end oneself is initialized.

After completing execution of the step S904 or after completing execution of the step S906, results of execution that have been made heretofore are returned to each section from which each demand was transmitted (step S907).

Furthermore, either when provision of a service to the client C1 was completed as a result of the step S903, or when results of execution in a demand for operation were transmitted to a section from which the demand was transmitted, a procedure is repeated from the step S901.

It is to be noted that the above-mentioned on-demand service expanding equipment 101 may be realized by installing a program that has been stored in a memory medium on a communication device in a communication net, the program being a software for realizing respective means of the service broker 102 and the broker controller 103.

In the following, a service providing system to which on-demand service expanding equipment 101 according to an embodiment of the present invention will be described. This service providing system relates to a manner for providing a variety of services such as e-mail service, and Web service.

Figure 11:
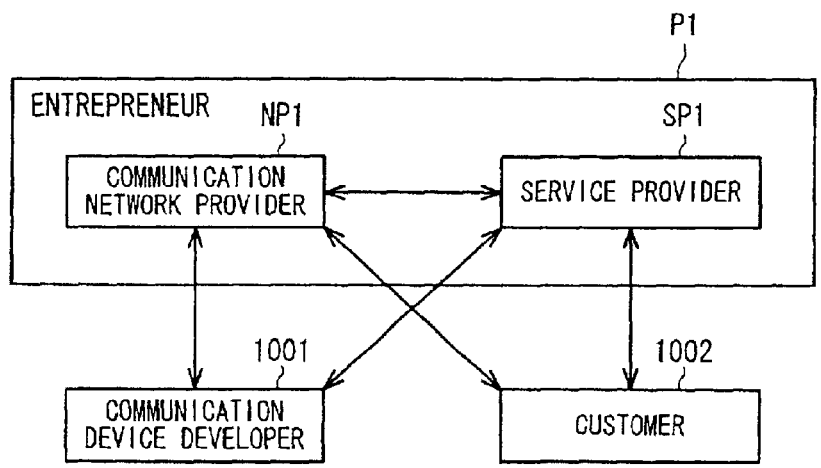
FIG. 11 is a block diagram showing a constitution of a service providing system to which an on-demand service expanding system has been applied.

FIG. 11 is a block diagram showing a service providing system to which the on-demand service expanding equipment 101 according to an embodiment of the present invention.

As shown in FIG. 11, this service providing system is composed of a communication equipment developer 1001, a communication network provider NP1, a service provider SP1, and a customer 1002.

The communication equipment developer 1001 manufactures communication network equipment to which the on-demand service expanding equipment 101 according to an embodiment of the present invention has been implemented, and the communication network equipment thus manufactured is supplied to the communication network provider NP1. Hence, the on-demand service expanding equipment 101 are used in response to communication network equipment which has been supplied to each communication network provider NP1 to provide a service implementing atmosphere corresponding to a manner for implementing a server S1, a front-end F1, and a client C1 for supplying a service to the customer 1002 with respect to the service provider SP1.

The communication network provider NP1 constructs a communication network by the use of communication equipment that has been provided by the communication developer 1001 and housing the on-demand service expanding equipment 101, and puts the resulting communication network into practice. Furthermore, a connection service with the communication network that is operated by the communication network provider NP oneself is provided with respect to the customer 1002. A service providing environment being an environment, which makes possible to provide a service with respect to the customer 1002 is supplied to a plurality of service providers by using the on-demand service expanding equipment 101 residing on a communication network that was constructed by the communication network provider NP oneself. In addition to a communication charge derived from use of communication network equipment, which is operated by the communication network provider NP oneself, for example, a charge corresponding to an amount of use in resources of communication network equipment such as an amount of memory in communication network equipment is collected from a plurality of service providers as a charge for service providing environment, respectively.

Moreover, the service provider SP1 constructs a server S1, a front-end F1, and a client C1 to which a service to be provided to a customer 1002 has been implemented, respectively, by using a service providing environment supplied by the communication network provider NP1 and a service implementing environment supplied from the communication equipment developer 1001, and the client C1 is distributed to the customer 1002, whereby a service is provided with respect to the customer 1002. The service provider S1 determines use fees for the service that is provided by the service provider S1 oneself with taking a charge to be paid to the communication network provider NP1 administering the network that is used by the service provider SP1 oneself into consideration, and the use fees determined are collected from customers who make an agreement of using such service.

Figure 12:
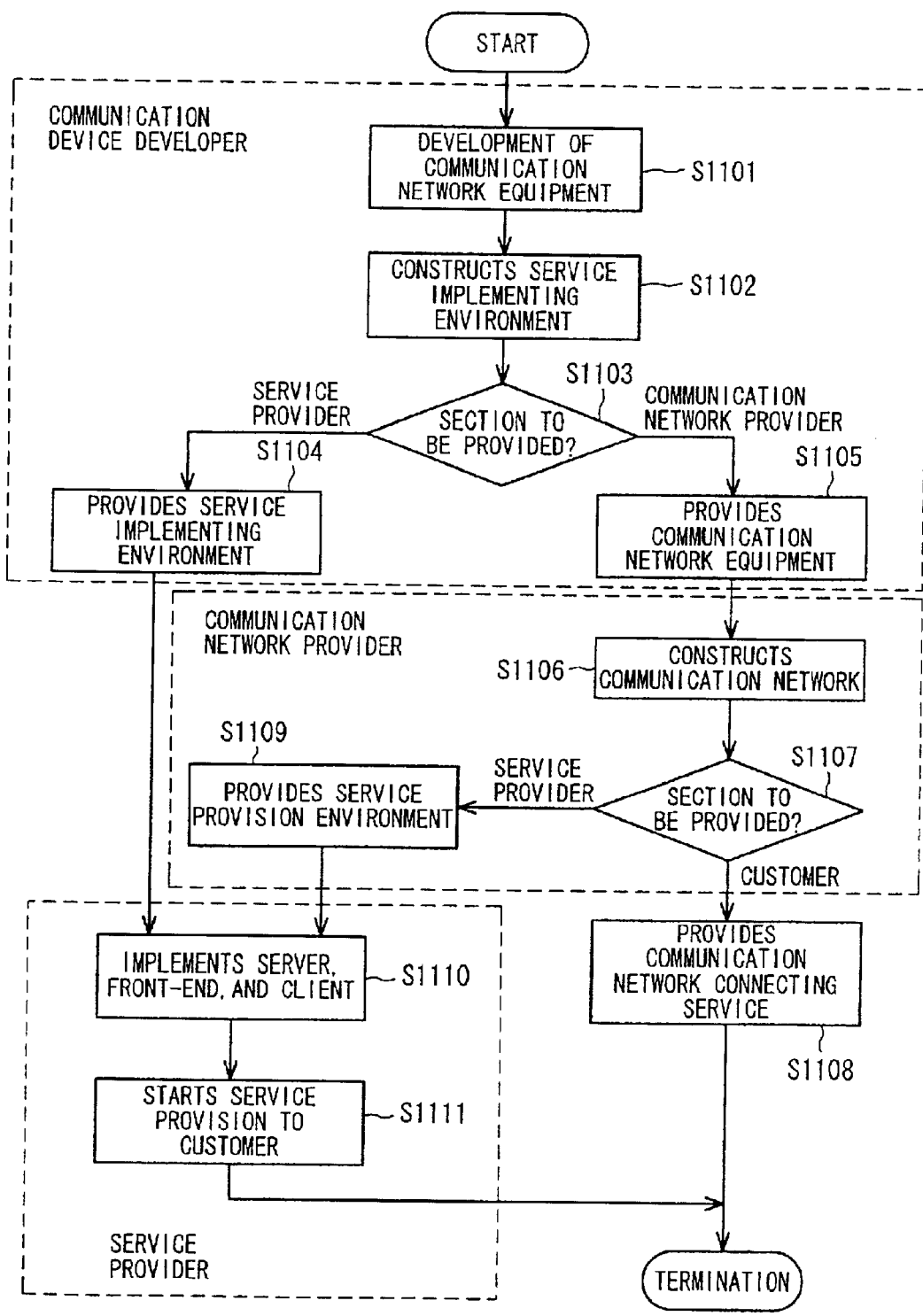
FIG. 12 is a flowchart illustrating a flow of the business model shown in FIG. 11.

As shown in FIG. 11, the entrepreneur P1 of FIG. 12 is composed of a communication network provider NP1, and a service provider SP1. Furthermore, although such a manner wherein a single communication network provider (NP1 in FIG. 11) is made an agreement with a single service provider (SP1 in FIG. 11) has been illustrated in FIG. 11, there are actually a manner wherein a single communication provider is made an agreement with a plurality of service providers, and a manner wherein a single service provider is made an agreement with a plurality of communication network providers.

The customer 1002 receives a variety of services such as a connection service with a communication network operated by a communication network provider NP1 that is derived from an agreement with the communication network provider NP1 as well as a web service, an e-mail service, and the like service operated by a service provider SP1 that is derived from an agreement with the service provider SP1 as a result of paying use fees that are derived from the agreement with either of the communication network provider NP1 or the service provider SP1.

In the following, a flow until provision of a service in a service providing system shown in FIG. 11 will be described in detail by referring to the accompanying drawings.

FIG. 12 is a flowchart illustrating a flow until a service is provided with respect to a customer from a communication network provider NP1 and a service provider SP1, respectively.

First, a communication equipment developer 1001 develops communication network equipment to which on-demand service expanding equipment 101 has been mounted (step S1101).

Then, the communication equipment developer 1001 constructs a service implementing environment for implementing a server 1, a front-end F1, and a client C1 that operate on on-demand service expanding equipment 101, which has been mounted on communication network equipment in the step S1101 (step S1102).

The communication network equipment and the service implementing environment developed in the steps S1101 and S1102 are supplied to a communication network provider NP1 and a service provider SP1, respectively (step S1103). In the step S1103, the communication equipment developer 1001 sells communication network equipment with respect to the communication network provider NP1 by expressing such an advantage that a more responsive service can be provided by the communication network provider NP1 with respect to the customer 1002 by means of construction of a communication network with the use of communication network equipment developed by the communication equipment developer 1001. Moreover, the communication equipment developer 1001 sells a service implementing environment with respect to the service provider SP1 by expressing such an advantage that efficient implement of a server S1, a client C1, and a front-end F1, which realize service provision by means of the on-demand service expanding equipment 101 adopted by a communication network provider NP1 with which the service provider SP1 makes an agreement becomes possible.

As a result of the step S1103, when a member providing a service is the service provider SP1, a service implementing environment is provided (step S1104).

As a result of the step S1103, when a member providing a service is the communication network provider NP1, communication network equipment is provided (step S1105).

Then, the communication network provider NP1 that purchased communication network equipment to which the on-demand service expanding equipment 101 has been implemented from the communication equipment developer 1001 in the step S1105 constructs a communication network operated by the communication network provider NP1 oneself by the use of the communication network equipment purchased (step S1106). More specifically, a service providing environment wherein service provision with respect to a customer 1002 can be realized by the service provider NP1 as well as a communication network connecting service corresponding to an environment wherein a customer 1002 connects to a communication network operated by the communication network provider NP1 such as IP connection are constructed on a communication network operated by the communication network provider NP1.

A service providing environment and a communication network connecting service constructed in the step S1106 are provided to the service provider SP1 and the customer 1002, respectively (step S1107). In the step S1107, the communication network provider NP1 makes an agreement with the service provider SP1 by expressing with respect to the service provider SP1 such an advantage that a higher responsive service is possible by using a communication network operated by the communication network provider NP1 to provide a service to the customer 1002.

As a result of the step S1107, the communication network provider NP1 supplies a service providing environment to the service provider SP1 (step S1109).

As a result of the step S1107, the communication network provider NP1 provides a connection service with a communication network operated by the communication network provider NP1 with respect to the customer 1102 (step S1108).

The service provider SP1 implements a service to be supplied to the customer 1002 by using a service implementing environment purchased from the communication equipment developer 1001 as a result of the step S1104, and a service providing environment that becomes possible to use as a result of making an agreement with the communication network provider NP1 in the step S1109 (step S1110). More specifically, a server S1, a client C1, and a front-end F1 are implemented in accordance with a service-implementing environment.

By the use of the server S, the client C1, and the front-end F1 implemented in the step S1110, the service provider SP1 starts to provide services with respect to the customer 1002 (step S1111).

Since a flow in case of providing a service to the customer 1002 on and after is the same as that shown in a service providing system of a service-contents preliminary delivery type, the explanation therefor is omitted herein.

As described above, an embodiment of the present invention involves such an advantage that when no front-end for providing a service to be used by a client resides on a communication device that was the one in a service broker connected first with the client, a front-end in question is immediately started up to distribute the same on the communication device in question, so that the client can receive always a service at the nearest communication device.

Furthermore, a control function for a front-end that has been implemented in a server according to the prior art is provided by means of a broker controller, whereby it becomes possible to concentrate an effort on a development of a program for implementing service provision being an essential occupation of a server developer. Accordingly, there is such an advantage that a cost for developing server becomes possible to be suppressed.

Moreover, when a broker controller supplies, for example, an interface with an entrepreneur as a control screen, a manner for administering a front-end can be standardized as to all the services. Accordingly, there is such an advantage that a cost for administering services can be reduced.

Besides, in a service providing system of a service contents preliminary delivery type to which an on-demand service expanding system according to an embodiment of the present invention has been applied, service contents, which are forecasted to be used by a client are transferred from a server to a front-end in parallel to a treatment of a demand for connecting the client with the front-end that was issued from the client, so that it brings about a situation wherein the service contents that are forecasted to be used by the client resides on the nearest communication device from the client at the time when the client starts to receive the service from the front-end. Accordingly, there is such an advantage that a higher responsive service can be received by the client from the server.

In addition, according to a service providing system to which an on-demand service expanding system has been applied, a communication network provider providing a communication network and a service provider providing services are specifically defined, and the communication network provider administering a communication network in question determines and collects use fees of each service provider in response to an agreement with each service provider in the form of cooperative burden share as to use fees of the communication network used by a plurality of service providers. Accordingly, the service provider comes to be possible to suppress inexpensively a use cost of such communication network, so that the service provider can provide services at a lower cost with respect to customers. As a result, a communication equipment developer and entrepreneurs (communication network provider and service provider) who have adopted this service providing system can establish a distinction from competitors.

Therefore, there is such an advantage that much more customers can be captured, whereby a benefit is elevated.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An on-demand service expanding system connectable to a system provided with a server supplying a variety of services including a connection service with a communication network, a plurality of clients each receiving said variety of services, a plurality of front-ends interposed between said plurality of clients and said server and executing a part of said variety of services of said server based on a demand from each of said plurality of clients, and service expanding equipment connectable to a communication base, said on-demand service expanding system comprising:

at least one service broker, and at least one broker controller;

said service broker being provided with a means for selecting a front-end among said plurality of front ends that matches a demand of service transmitted from one client among said plurality of clients, said selected front-end connected to said one client to transmit contents of the demand of service with respect to the selected front-end; and said broker controller being provided with a means for controlling the selected front-end so as to connect the selected front end with said server, and a means for controlling said server, said selected front-end, and the service broker from which said contents of the demand of service was transmitted for a period of time during provision of the service.

2. An on-demand service expanding system connectable to a system provided with a server and a plurality of front ends, said plurality of front ends interposed between a plurality of clients for supplying a variety of services to said plurality of clients, said service expanding system providing services by the use of said plurality of front ends, said services being implemented by an entrepreneur which includes computers in a communication network composed of communication devices and the computers, said entrepreneur providing the variety of services with respect to customers by the use of said communication network, said plurality of front ends and at least partially executing functions for processing data of the server on at least one of said communication devices, comprising:

service brokers and broker controllers;

each service broker being provided with:

means for transferring a demand for using a service transmitted from each client and each front-end to a pertinent front-end, means for transmitting said demand for controlling the pertinent front-end to said broker controller, means for administering front-end information being information as to a front-end in a communication device on which the service broker resides and containing information of an interface mounted to a front-end for connecting a client, the server, and the service broker with the front-end, a name of a service implemented by the front-end, and information of the communication device on which the front-end resides, and means for providing a service broker functional interface which includes an interface by which a group of said respective means are used from the broker controller, the front-ends, and the clients; and said broker controller residing on a computer that supplies services and being provided with:

means for administering a program included on each front-end or the server, means for controlling each front-end operated on each communication device, means for controlling the server operated on each computer, means for controlling the service broker residing on each communication device;

means for administering service administering information, and means for providing an interface by which a group of said means are used from the service brokers, the server, and the entrepreneurs;

said service administering information containing an identifier allocated by each broker controller in order that a program is discriminated by the broker controller, a name of service that can be realized by using programs in the server and each front-end, program information being information as to the programs including the server and each front-end, information of an interface for connecting each front-end and each broker controller with the server, server information involving a name of service implemented to the server and being information as to the server installed by each entrepreneur, information of the service broker functional interface for connecting each broker controller with a service broker residing on each communication device, information of a communication device on which each service broker resides, and a system information involving an interface for using a control function of each front-end provided by said service expanding system and being information as to the on-demand service expanding system.

3. An on-demand service expanding system as claimed in claim 2, wherein when a given front-end providing a service that is requested by a given client to use the given front end does not reside on a communication device located in the nearest service broker with which the given client has been connected, said service broker transmits a distribution of and a demand for starting up the given front-end to said broker controller, whereby a connecting point of the given client with service is distributed in an on-demand manner to the nearest communication device.

4. A system for providing services involving a communication network provider, service providers, and customers, comprising:

said communication network provider constructing and operating a communication network by the use of communication equipment and computers in which the service providing system of a service-contents preliminary delivery type as claimed in claim 3 has been installed to provide a connection service with the communication network operated by the communication network provider with respect to the customers, whereby an environment making possible to provide services to the customers by the use of the on-demand service expanding system residing on the communication network constructed by the communication network provider (hereinafter referred to as "service providing environment") is supplied to a plurality of the service providers, so that use fees for the service providing environment in response to use fees for resources of the communication equipment in addition to communication fees for the communication network operated by the communication network provider are collected from the plurality of service providers; and said service providers constructing servers and front-ends in which services to be provided to customers have been installed in the service providing environment supplied from said communication network provider to distribute clients to the customers thereby to provide services with respect to the customers, and determining use fees of a service to be supplied to the customers from the service providers themselves with taking fees to be paid to the communication network provider into consideration, and collecting the fees determined from each customer who makes an agreement with the service providers in use of services.

5. An on-demand service expanding system as claimed in claim 2, further comprising:

said server being provided with a service forecasting means for extracting service contents that are forecasted to be used by at least one of said plurality of clients; and said front-end being provided with a means for receiving from the server service contents that are forecasted to be used by said at least one of said plurality of clients and maintaining the same to provide the service contents received with respect to the at least one of said plurality of clients in question.

6. An on-demand service expanding system as claimed in claim 5, comprising:

a means wherein the service broker transmits such a demand that the server extracts service contents that are forecasted to be used by at least one of said plurality of clients in a parallel manner during a period of time in which the at least one of said plurality of clients checks or newly establishes a front-end to be connected with the at least one of said plurality of clients at the time when the at least one of said plurality of clients is connected with the service broker, and transfers the service contents extracted to the front-end in question with respect to the server from which a service to be received by the at least one of said plurality of clients is supplied through the broker controller, whereby the service contents that are forecasted to be used by the at least one of said plurality of clients have been already present in the front-end in question at the time when the at least one of said plurality of clients transmits a demand for use of service to the front-end in question.

7. An on-demand service expanding system as claimed in claim 6, wherein:

said service-forecasting means involves a means for maintaining an access history with respect to Web pages by at least one of said plurality of clients, and forecasting a service, which will be used by the at least one of said plurality of clients from the history.

8. A system for providing services involving a communication network provider, service providers, and customers, comprising:

said communication network provider constructing and operating a communication network by the use of communication equipment and computers in which the service providing system of a service-contents preliminary delivery type as claimed in claim 7 has been installed to provide a connection service with the communication network operated by the communication network provider with respect to the customers, whereby an environment making possible to provide services to the customers by the use of the on-demand service expanding system residing on the communication network constructed by the communication network provider (hereinafter referred to as "service providing environment") is supplied to a plurality of the service providers, so that use fees for the service providing environment in response to use fees for resources of the communication equipment in addition to communication fees for the communication network operated by the communication network provider are collected from the plurality of service providers; and said service providers constructing servers and front-ends in which services to be provided to customers have been installed in the service providing environment supplied from said communication network provider to distribute clients to the customers thereby to provide services with respect to the customers, and determining use fees of a service to be supplied to the customers from the service providers themselves with taking fees to be paid to the communication network provider into consideration, and collecting the fees determined from each customer who makes an agreement with the service providers in use of services.

9. An on-demand service expanding system as claimed in claim 6, wherein:

said service forecasting means involves a means for selecting e-mails that have been addressed to the at least one of said plurality of clients based on an identifier delivered from said broker controller.

10. A system for providing services involving a communication network provider, service providers, and customers, comprising:

said communication network provider constructing and operating a communication network by the use of communication equipment and computers in which the service providing system of a service-contents preliminary delivery type as claimed in claim 9 has been installed to provide a connection service with the communication network operated by the communication network provider with respect to the customers, whereby an environment making possible to provide services to the customers by the use of the on-demand service expanding system residing on the communication network constructed by the communication network provider (hereinafter referred to as "service providing environment") is supplied to a plurality of the service providers, so that use fees for the service providing environment in response to use fees for resources of the communication equipment in addition to communication fees for the communication network operated by the communication network provider are collected from the plurality of service providers; and said service providers constructing servers and front-ends in which services to be provided to customers have been installed in the service providing environment supplied from said communication network provider to distribute clients to the customers thereby to provide services with respect to the customers, and determining use fees of a service to be supplied to the customers from the service providers themselves with taking fees to be paid to the communication network provider into consideration, and collecting the fees determined from each customer who makes an agreement with the service providers in use of services.

11. A system for providing services involving a communication network provider, service providers, and customers, comprising:

said communication network provider constructing and operating a communication network by the use of communication equipment and computers in which the service providing system of a service-contents preliminary delivery type as claimed in claim 6 has been installed to provide a connection service with the communication network operated by the communication network provider with respect to the customers, whereby an environment making possible to provide services to the customers by the use of the on-demand service expanding system residing on the communication network constructed by the communication network provider (hereinafter referred to as "service providing environment") is supplied to a plurality of the service providers, so that use fees for the service providing environment in response to use fees for resources of the communication equipment in addition to communication fees for the communication network operated by the communication network provider are collected from the plurality of service providers; and said service providers constructing servers and front-ends in which services to be provided to customers have been installed in the service providing environment supplied from said communication network provider to distribute clients to the customers thereby to provide services with respect to the customers, and determining use fees of a service to be supplied to the customers from the service providers themselves with taking fees to be paid to the communication network provider into consideration, and collecting the fees determined from each customer who makes an agreement with the service providers in use of services.

12. An on-demand service expanding system as claimed in claim 5, wherein:

said service-forecasting means involves a means for maintaining an access history with respect to Web pages by at least one of said plurality of clients, and forecasting a service, which will be used by the at least one of said plurality of clients from the history.

13. A system for providing services involving a communication network provider, service providers, and customers, comprising:

said communication network provider constructing and operating a communication network by the use of communication equipment and computers in which the service providing system of a service-contents preliminary delivery type as claimed in claim 12 has been installed to provide a connection service with the communication network operated by the communication network provider with respect to the customers, whereby an environment making possible to provide services to the customers by the use of the on-demand service expanding system residing on the communication network constructed by the communication network provider (hereinafter referred to as "service providing environment") is supplied to a plurality of the service providers, so that use fees for the service providing environment in response to use fees for resources of the communication equipment in addition to communication fees for the communication network operated by the communication network provider are collected from the plurality of service providers; and said service providers constructing servers and front-ends in which services to be provided to customers have been installed in the service providing environment supplied from said communication network provider to distribute clients to the customers thereby to provide services with respect to the customers, and determining use fees of a service to be supplied to the customers from the service providers themselves with taking fees to be paid to the communication network provider into consideration, and collecting the fees determined from each customer who makes an agreement with the service providers in use of services.

14. An on-demand service expanding system as claimed in claim 5, wherein:

said service forecasting means involves a means for selecting e-mails that have been addressed to the at least one of said plurality of clients based on an identifier delivered from said broker controller.

15. A system for providing services involving a communication network provider, service providers, and customers, comprising:

said communication network provider constructing and operating a communication network by the use of communication equipment and computers in which the service providing system of a service-contents preliminary delivery type as claimed in claim 14 has been installed to provide a connection service with the communication network operated by the communication network provider with respect to the customers, whereby an environment making possible to provide services to the customers by the use of the on-demand service expanding system residing on the communication network constructed by the communication network provider (hereinafter referred to as "service providing environment") is supplied to a plurality of the service providers, so that use fees for the service providing environment in response to use fees for resources of the communication equipment in addition to communication fees for the communication network operated by the communication network provider are collected from the plurality of service providers; and said service providers constructing servers and front-ends in which services to be provided to customers have been installed in the service providing environment supplied from said communication network provider to distribute clients to the customers thereby to provide services with respect to the customers, and determining use fees of a service to be supplied to the customers from the service providers themselves with taking fees to be paid to the communication network provider into consideration, and collecting the fees determined from each customer who makes an agreement with the service providers in use of services.

16. A system for providing services involving a communication network provider, service providers, and customers, comprising:

said communication network provider constructing and operating a communication network by the use of communication equipment and computers in which the service providing system of a service-contents preliminary delivery type as claimed in claim 5 has been installed to provide a connection service with the communication network operated by the communication network provider with respect to the customers, whereby an environment making possible to provide services to the customers by the use of the on-demand service expanding system residing on the communication network constructed by the communication network provider (hereinafter referred to as "service providing environment") is supplied to a plurality of the service providers, so that use fees for the service providing environment in response to use fees for resources of the communication equipment in addition to communication fees for the communication network operated by the communication network provider are collected from the plurality of service providers; and said service providers constructing servers and front-ends in which services to be provided to customers have been installed in the service providing environment supplied from said communication network provider to distribute clients to the customers thereby to provide services with respect to the customers, and determining use fees of a service to be supplied to the customers from the service providers themselves with taking fees to be paid to the communication network provider into consideration, and collecting the fees determined from each customer who makes an agreement with the service providers in use of services.

17. An on-demand service expanding system as recited in claim 2 further comprising:

a system for providing services involving a communication network provider, service providers, and said customers, wherein:

said communication network provider operating said communication network by the use of communication equipment and said computers to provide a connection service with the communication network operated by the communication network provider with respect to the customers, wherein an environment making possible to provide services to the customers by the use of the on-demand service expanding system residing on the communication network constructed by the communication network provider (hereinafter referred to as "service providing environment") is supplied to a plurality of the service providers, so that use fees for the service providing environment in response to use fees for resources of the communication equipment in addition to communication fees for the communication network operated by the communication network provider are collected from the plurality of service providers; and said service providers constructing servers and front-ends in which services to be provided to the customers have been installed in the service providing environment supplied from said communication network provider to distribute clients to the customers thereby to provide services with respect to the customers, and determining use fees of a service to be supplied to the customers from the service providers themselves taking into consideration fees to be paid to the communication network provider, and collecting the fees determined from each customer who makes an agreement with the service providers in use of services.

18. A computer readable storage medium, storing a program which, when executed on computers or communication devices used in an on-demand service expanding system connectable to a system provided with a server is operable for supplying a variety of services including a connection service with a communication network, permitting reception by a plurality of clients for receiving said variety of services, permitting operation of a plurality of front-ends interposed between said plurality of clients and said server and executing a part of said variety of services of said server based on a demand from each of said plurality of clients, permitting connection of service expanding equipment to a communication base, said on-demand service expanding system having at least one service broker, and at least one broker controller, said program begin further operative for permitting said service broker to select a front-end among said plurality of front ends that matches a demand of service transmitted from one client among said plurality of clients, said selected front-end connected to said one client to transmit contents of the demand of service with respect to the selected front-end; and permitting said broker controller to control the selected front-end so as to connect the selected front end with said server, and to control said server, said selected front-end, and the service broker from which said contents of the demand of service was transmitted for a period of time during provision of the service.

19. A computer readable storage medium storing a program which, when executed on at least one computer or at least one communication device in an on-demand service expanding system connectable to a system provided with a server and a plurality of front ends interposed between a plurality of clients is operative for supplying a variety of services to said plurality of clients by the use of said plurality of front ends, implementing said services by an entrepreneur which includes a plurality of computers, including said at least one computer, in a communication network composed of a plurality of communication devices, including said at least one communication device, and the plurality of computers, providing said plurality of service, via said entrepreneur, with respect to customers by the use of said communication network, said plurality of front ends end at least partially executing functions for processing data of the server on said at least one of said communication devices, said on-demand service expanding system having service brokers and broker controllers; each service broker being controlled by said program for:

transferring a demand for using a service transmitted from each client and each front-end to a pertinent front-end, transmitting said demand for controlling the pertinent front-end to said broker controller, administering front-end information being information as to a front-end in a communication device on which the service broker resides and containing information of an interface mounted to a front-end for connecting a client, the server, and the service broker with the front-end, a name of a service implemented by the front-end, and information of the communication device on which the front-end resides, and providing a service broker functional interface which includes an interface by which a group of said respective means are used from the broker controller, the front-ends, and the clients; and said broker controller residing on a computer that supplies services and operates under program control when being executed on said computer for:

administering a program included on each front-end or the server, controlling each front-end operated on each communication device, controlling the server operated on each computer, controlling the service broker residing on each communication device;

administering service administering information, and providing an interface by which a group of said means are used from the service brokers, the server, and the entrepreneurs;

said service administering information containing an identifier allocated by each broker controller in order that a program is discriminated by the broker controller, a name of service that can be realized by using programs in the server and each front-end, program information being information as to the programs including the server and each front-end, information of an interface for connecting each front-end and each broker controller with the server, server information involving a name of service implemented to the server and being information as to the server installed by each entrepreneur, information of the service broker functional interface for connecting each broker controller with a service broker residing on each communication device, information of a communication device on which each service broker resides, and a system information involving an interface for using a control function of each front-end provided by said service expanding system and being information as to the on-demand service expanding system.

20. A computer readable storage medium storing a program as recited in claim 19 and wherein said on-demand service expanding system further comprises when a given front-end providing a service that is requested by a given client to use the given front end does not reside on a communication device located in the nearest service broker with which the given client has been connected, said service broker transmits a distribution of and a demand for starting up the given front-end to said broker controller, whereby a connecting point of the given client with service is distributed in an on-demand manner to the nearest communication device.

21. A computer readable storage medium storing a program as recited in claim 19 wherein said on-demand service expanding system further comprises:

said client, said front-end, said server, said service-expanding system, and said on-demand service expanding system;

said server being provided with a service forecasting means for extracting service contents that are forecasted to be used by said client; and said front-end being provided with a means for receiving from the server service contents that are forecasted to be used by a client and maintaining the same to provide the service contents received with respect to the client in question.

22. A computer readable storage medium storing a program as recited in claim 21 wherein said on-demand service expanding system further comprises:

a means wherein the service broker transmits such a demand that the server extracts service contents that are forecasted to be used by a client in a parallel manner during a period of time in which the client checks or establishes newly a front-end to be connected with the client at the time when the client connected with the service broker, and transfers the service contents extracted to the front-end in question with respect to the server from which a service to be received by the client is supplied through the broker controller, whereby the service contents that are forecasted to be used by the client have been already present in the front-end in question at the time when the client transmits a demand for use of service to the front-end in question.

23. A computer readable storage medium storing a program as recited in claim 21 wherein said on-demand service expanding system further comprises:

said service-forecasting means involves a means for maintaining an access history with respect to Web pages by a client, and forecasting a service, which will be used by the client from the history.

24. A computer readable storage medium storing a program as recited in claim 21 wherein said on-demand service expanding system further comprises:

said service forecasting means involves a means for selecting e-mails that have been addressed to the client based on an identifier delivered from said broker controller.

25. A computer readable storage medium storing a program as recited in claim 19 wherein said on-demand service expanding system further comprises, wherein an environment making possible to provide services to the customers by the use of the on-demand service expanding system residing on the communication network constructed by the communication network provider (hereinafter referred to as "service providing environment") is supplied to a plurality of the service providers, so that use fees for the service providing environment in response to use fees for resources of the communication equipment in addition to communication fees for the communication network operated by the communication network provider are collected from the plurality of service providers; and said service providers constructing servers and front-ends in which services to be provided to customers have been installed in the service providing environment supplied from said communication network provider to distribute clients to the customers thereby to provide services with respect to the customers, and determining use fees of a service to be supplied to the customers from the service providers themselves with taking fees to be paid to the communication network provider into consideration, and collecting the fees determined from each customer who makes an agreement with the service providers in use of services.

* * * * *